No. 867,459. PATENTED OCT. 1, 1907.
C. H. WILLARD.
WATER CURRENT MOTOR.
APPLICATION FILED JAN. 21, 1907.

3 SHEETS—SHEET 1.

Witnesses

Inventor
Charles Henry Willard
By Henry N. Copp
His Attorney

No. 867,459. PATENTED OCT. 1, 1907.
C. H. WILLARD.
WATER CURRENT MOTOR.
APPLICATION FILED JAN. 21, 1907.

3 SHEETS—SHEET 3.

Witnesses

Inventor
Charles Henry Willard
By Henry N. Copp
His Attorney

UNITED STATES PATENT OFFICE.

CHARLES HENRY WILLARD, OF PASADENA, CALIFORNIA.

WATER-CURRENT MOTOR.

No. 867,459.　　　Specification of Letters Patent.　　　Patented Oct. 1, 1907.

Application filed January 21, 1907. Serial No. 353,299.

*To all whom it may concern:*

Be it known that I, CHARLES HENRY WILLARD, a citizen of the United States, residing at Pasadena, county of Los Angeles, and State of California, have invented certain new and useful Improvements in Water-Current Motors, of which the following is a specification.

My invention relates to water current motors.

The object of the present invention is the provision of a motor adapted for utilizing the ebb and flow of the tide or of any body of water, such as the tide flowing through a channel, strait, sound, cañon, gorge, or at a rapid or in a stream wherein provision is made for the regulation of the amount of water utilized; means are provided for the automatic rising and falling of the device according to the rise and fall of the water; means provided for positioning or locating the motor in the desired place; means utilized for transmitting the power generated; all of improved and novel construction and arrangement, whereby the force of the water as it moves, or ebbs and flows, without regard to direction of movements, may be utilized with a high percentage of efficiency and transmitted to any desired point.

The invention is set forth fully hereinafter and the novel features are recited in the appended claims.

Figure 1:
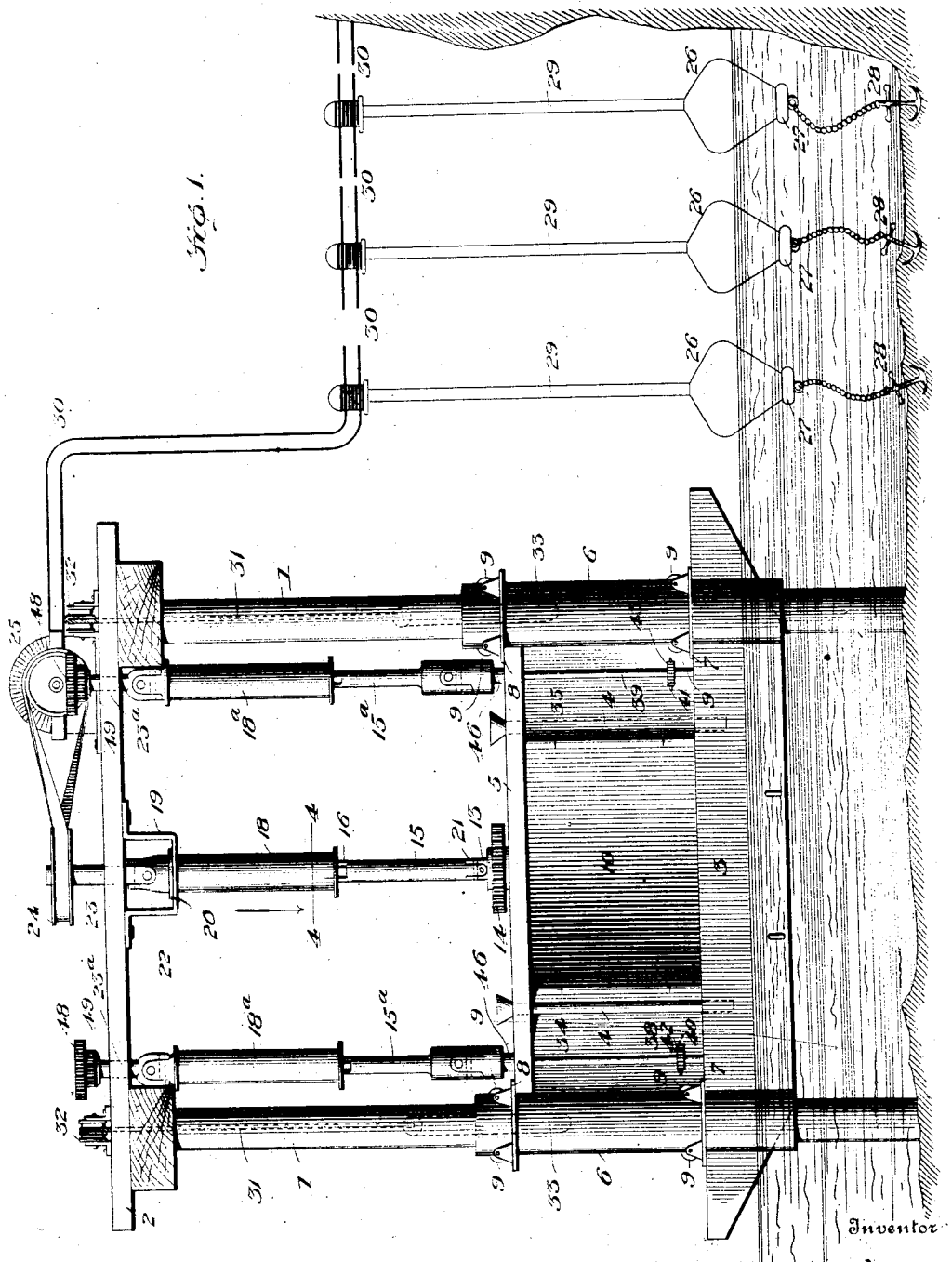
Figure 2:
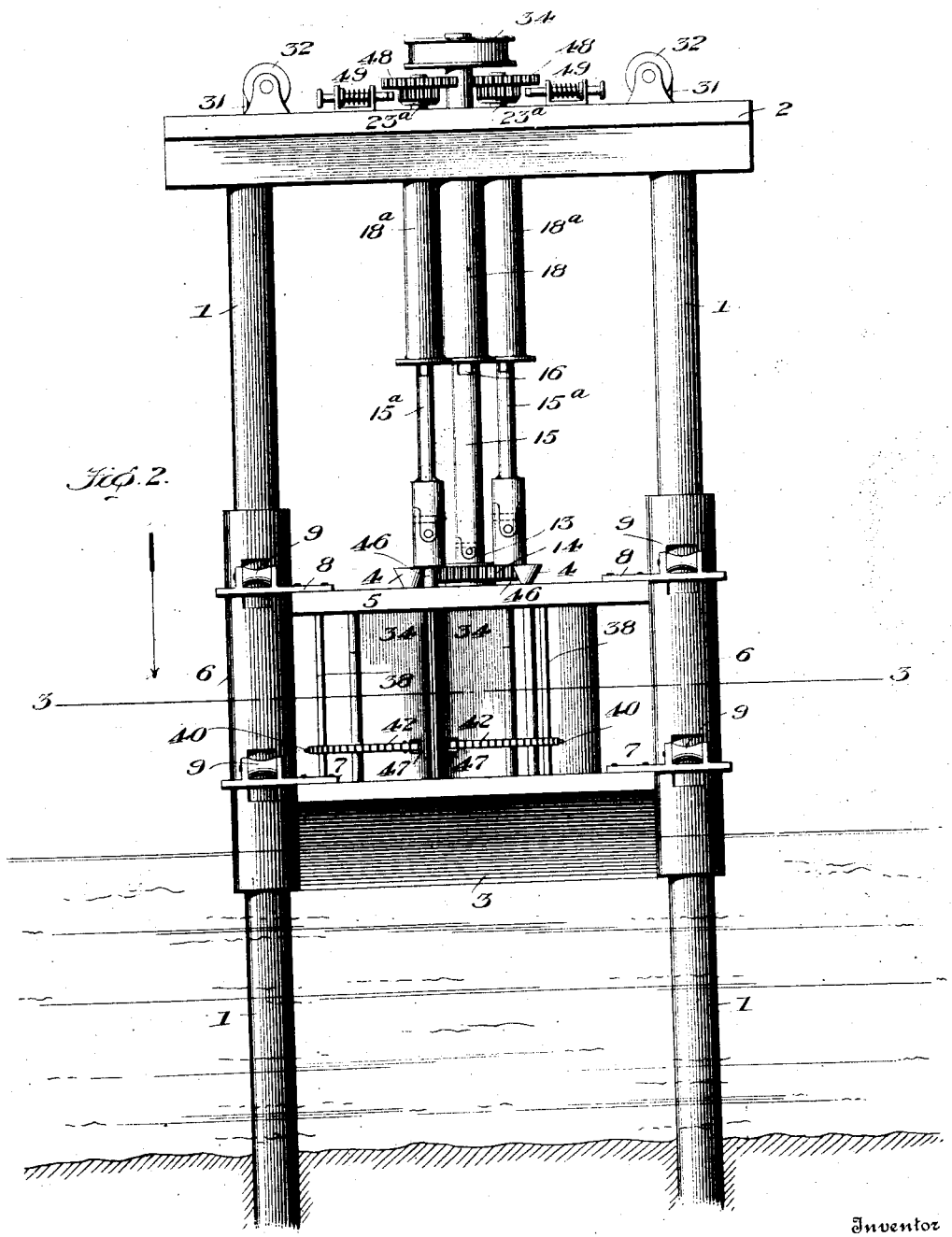
Figure 3:
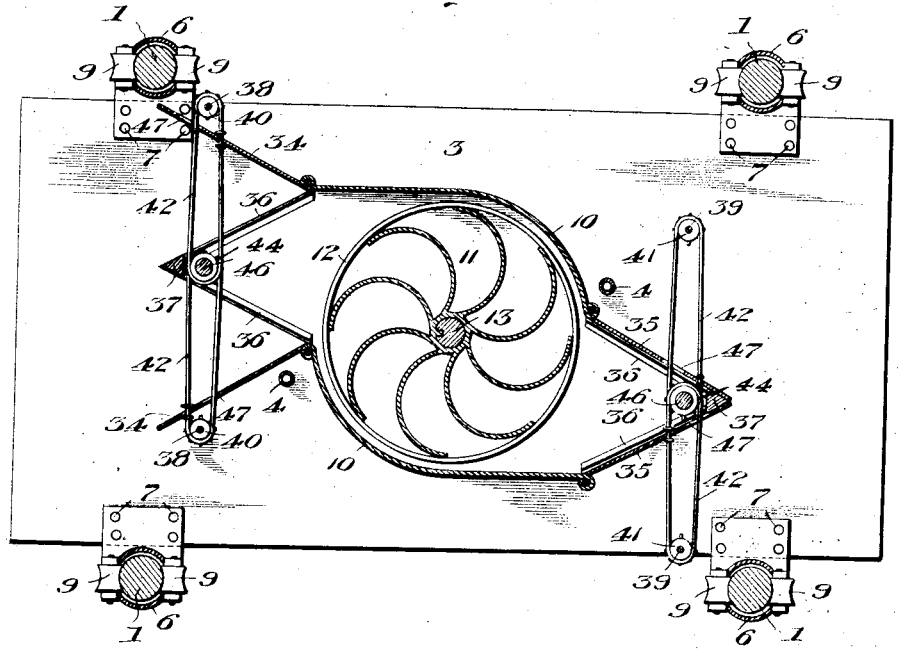
Figure 4:
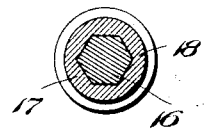
Figure 5:
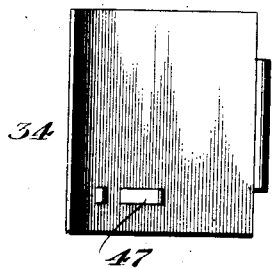

In the accompanying drawings:—Figure 1 is a side elevation, Fig. 2 is an end elevation, Fig. 3 is a horizontal sectional view taken on the line 3—3 of Fig. 3, Fig. 4 is a detail cross sectional view taken on the line 4—4 of Fig. 1 and, Fig. 5 is a detail view of one of the gates.

According to the location of the apparatus, the arrangement and construction of the guiding and supporting means for the motor and float may vary, but in the drawings I have disclosed the preferred construction and the one which will be most generally used. Suitably sunk and anchored in the bed of the body of water where the apparatus is used, are the solid or hollow pillars 1. Above the surface of the water these pillars are connected by a framing and platform 2, whereby they are braced.

The pillars 1 are for the guidance, in its rise and fall, of a float or scow 3 which is provided with upright pipes 4 through which water may be introduced to the scow or float interior, as the latter is hollow and thus the float or scow may be properly weighted so that it will be submerged in the water to the desired extent. Other means of ballasting or weighting the scow or float may be employed. Extending parallel to the scow or float and above it is a platform 5. Secured to the platform 5 and to the scow or float 3 and slidable on the pillars 1 are the sleeves 6 which are secured to said scow at 7 and to the platform 5 at 8, whereby the platform is supported from the scow and the two are rigidly connected together. Carried by the sleeves 6 are concaved antifriction rollers 9 which are located on a level with the scow 3 and platform 5, respectively, or substantially thereat, whereby the rise and fall of the scow and platform, and parts carried thereby, is made as frictionless as possible for it will be understood that the sleeves 6 are not meant to bear on the pillars or columns 1.

Located between and secured to the float 3 and platform 5 is a motor or waterwheel shell or casing 10 which is so constructed that at one side the water will be directed toward the blades or vanes of the waterwheel at one side of said wheel and at the other side of the casing the water will be directed toward the blades or vanes of the waterwheel on the opposite side of the said wheel. Herein I have an arrangement whereby both the ebb and the flow of the water or the flow of the water from either direction will cause a continuous rotation of the wheel at all times in the same direction.

The wheel is shown at 11 and it has curved blades or paddles connected by a bracing ring 12 and secured to a shaft 13 which is journaled in the platform 5 and the top of the float 3. Immediately above the platform 5, the shaft is provided with a gear-wheel 14 from which power may be derived, but as it is frequently desirable to derive the power from a higher point, I provide an improved telescopic shaft composed of shaft-section 15 having a polygonal part 16 received in a matching polygonal part 17 in a shaft-section 18. Shaft-section 18 is journaled in a bearing 19 secured to the under side of framework or platform 2 and is provided with a collar 20. A coupling or knuckle joint 21 which has detachable fastenings, connects the wheel-shaft with the shaft-section 15 and a similar connection 22 connects shaft-section 18 with a short shaft 23 which is journaled in platform 2 and provided with a fly-wheel 24 from which power may be derived. According to the location of the apparatus and the manner in which it is desired to derive power therefrom, the power may be taken directly from the fly-wheel 24 (a belt-pulley or sprocket wheel may be used also) to the shore or an electric dynamo 25 may be supported on the platform 2 and driven from the shaft 23. The apparatus is well adapted for such an arrangement as the platform 2 constitutes a suitable support for the electric generating apparatus and the electrical current derived may be transmitted to the shore by the employment of buoys 26 having weights 27 and properly anchored as shown at 28, said buoys supporting poles 29 which in turn support suitably insulated electric cables or conductors 30. With this arrangement, it makes no difference how far the apparatus may be located from the shore nor how great the rise and fall of the water or the rapidity of the water currents inasmuch as the electrical conductor supports are adapted to float or move around according to the play of the water currents.

In order that the waterwheel may be kept in the proper position to receive the upper currents of the water and to aid the scow or float in maintaining itself at the desired height, it is desirable to employ cables 31 connected to platform 5 and running over pulleys 32 and provided with counterbalancing weights 33; these latter may rise and fall inside of the tubular pillars 1 (if such tubular pillars are employed) or they may fall freely outside of the pillars if solid pillars are used or if it is preferred to have them thus positioned.

It is, of course, desirable to regulate the amount of water supplied to the waterwheel and I, therefore, provide laterally swinging twin gates 34 and 35 at the respective ends of the waterwheel casing, said gates being adapted to close against ribs or flanges 36 on the float 3 and also to abut a vertical member 37. Shafts 38 and 39, which are journaled in the scow 3 and platform 5, carry sprocket wheels 40 and 41 around which passes sprocket chains 42 which in turn pass around sprocket wheels 44 carried by vertical shafts 46 which are journaled in the platform 5 and float 3 immediately back of the members 37 and these chains are connected to the respective gates 34 and 35. Parts of the chains run through slots 47 in the gates.

A telescopic shaft, composed of sections 15ª and 18ª, corresponding to the sections 15 and 18, connect the shafts 46 to shafts 23ª journaled in the platform 2 and provided with sprocket wheels 48. These sprocket wheels may be connected by sprocket chains to sprocket wheels and operating apparatus on the shore if the device is located close to the shore, or, operating apparatus may be used on the platform 2 so that the gates may be opened and closed to the desired extent directly from the platform. Locking means 49 are employed to secure the gates in the desired open or closed position. (See Fig. 2.)

The gates having been set as found desirable, the current of water flows directly through the waterwheel casing (with return flow, or not, according to the location of the apparatus) and the waterwheel is kept in continuous rotation. The ballasting of the float or scow 3 and the counterweighting thereof causes it to be maintained in the desired submerged position so that the waterwheel receives the upper currents of water but the telescopic shafts, the pillars, the antifriction rollers, etc., permit the float 3, platform 5, gates, and waterwheel to rise and fall with the water without interfering with the transmission of the power from the waterwheel to the desired points. As I have heretofore pointed out, the location of the apparatus will determine, to some extent, whatever modifications of structure, principally as regards the pillars and guiding devices, may be desirable, and I do not, therefore, limit myself to the exact features of construction set forth, but consider that my invention contemplates all changes of structure coming within the general scope and spirit of the invention.

Having thus described my invention, what I claim as new and desire to secure by Letters Patent, is:—

1. In a water current motor, the combination with a waterwheel, of a casing therefor, an inlet opening for directing the water into the casing, a pair of swinging gates for directing the water to the opening when they are open and adapted to close together in angular arrangement to each other when closed, chains connected to the gates, and means for simultaneously operating the chains to simultaneously open or close the gates.

2. In a water current motor, the combination with a water wheel, of a casing therefor, an inlet opening for directing the water into the casing, a pair of swinging gates for directing the water to the opening, endless flexible connections attached to the gates, and means for simultaneously operating said endless flexible connections.

3. In a water current motor, the combination with a waterwheel, of a casing therefor, an inlet opening for directing the water into the casing, a pair of swinging gates for directing the water to the opening when they are opened and adapted to close together in angular arrangement to each other when closed, a rotary shaft carrying wheels, endless flexible connections passing around the respective wheels and respectively connected to the gates, and other wheels around which the respective flexible connections pass.

4. In a water current motor, the combination with a float, adapted to rise and fall, and means for guiding the float, of a waterwheel and waterwheel casing carried by the float, a platform which is stationary in relation to the float, and a telescopic shaft journaled in the platform and operatively connected to the waterwheel, whereby the float may rise and fall without interfering with the transmission of power from the waterwheel.

5. In a water current motor, the combination with a float adapted to rise and fall, and means for guiding the float, of a waterwheel and waterwheel casing carried by the float, a gate or closure for regulating the flow of water into the waterwheel casing, a platform which is stationary in relation to the float, and a telescopic shaft journaled in the platform and operatively connected to the gate, whereby the float may rise and fall without interfering with the operation of the gate.

6. In a water current motor, the combination with pillars, of a float, a platform above the float, a waterwheel carried by the float, a waterwheel shaft passing through the platform, and sleeves connected to the float and to the platform and encircling the pillars.

7. In a water current motor, the combination with pillars, of a float, a platform above the float, a waterwheel carried by the float, a waterwheel shaft passing through the platform, sleeves connected to the float and to the platform and encircling the pillars, and antifriction rollers carried by the float and platform which bear upon the pillars and guide the float and platform in their up and down movements.

In testimony whereof, I hereunto affix my signature in presence of two witnesses.

CHARLES HENRY WILLARD.

Witnesses:
FRANK H. PADELFORD,
CLARA J. FELSENTHAL.